(12) United States Patent
Vanderbles et al.

(10) Patent No.: US 6,741,908 B2
(45) Date of Patent: May 25, 2004

(54) MAIL BIN SORT SEQUENCE BINARY FILE GENERATOR

(75) Inventors: Gary F. Vanderbles, Binghamton, NY (US); Michael D. Senger, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 113 days.

(21) Appl. No.: 09/935,260

(22) Filed: Aug. 22, 2001

(65) Prior Publication Data

US 2002/0139727 A1 Oct. 3, 2002

Related U.S. Application Data

(60) Provisional application No. 60/227,335, filed on Aug. 23, 2000.

(51) Int. Cl.[7] .................................................. G06F 7/00
(52) U.S. Cl. ........................ 700/224; 700/223; 209/584; 209/900
(58) Field of Search ................................. 700/223, 224, 700/225, 226; 209/584, 900

(56) References Cited

U.S. PATENT DOCUMENTS

| | | |
|---|---|---|
| 3,889,811 A | 6/1975 | Yoshimura |
| 4,247,008 A | 1/1981 | Dobbs |
| 4,796,196 A | 1/1989 | Durst, Jr. et al. |
| 5,009,321 A | 4/1991 | Keough |
| 5,042,667 A | 8/1991 | Keough |
| 5,249,687 A * | 10/1993 | Rosenbaum et al. ......... 209/3.3 |
| 5,612,889 A * | 3/1997 | Pintsov et al. .............. 700/226 |
| 5,893,464 A | 4/1999 | Kiani et al. |
| 5,901,855 A | 5/1999 | Uno et al. |
| 6,156,988 A * | 12/2000 | Baker ......................... 209/584 |
| 6,385,504 B1 * | 5/2002 | Pintsov et al. .............. 700/226 |
| 6,463,354 B1 * | 10/2002 | Pintsov ....................... 700/227 |

OTHER PUBLICATIONS

"A Natural Sequence for Deutsche Post," Post–express—Special Supplement Issue, vol. 3, Issue 13, Jun. 30, 1999, pp. 19–22.

* cited by examiner

Primary Examiner—Khoi H. Tran
(74) Attorney, Agent, or Firm—Perkins Smith & Cohen LLP; Jacob N. Erlich; Harvey Kaye

(57) ABSTRACT

A sequential mail sorting system for generating sort sequence codes, interpreting them for the sequential sorting of mail into a mail carrier walk sequence and providing for holdout mail types, which includes reading a sort plan text file for a selected postal delivery zone and determining the number of bins required in the sorting machine, selecting the carriers whose routes are located in such zone, generating sort sequence codes for sorting the mail in a sequential order, and generating sequence codes for holdouts and regular mail types and placing them into a sort plan binary file. The generating of sort sequence codes includes generating and interpreting sort sequence codes for holdout mail types to allow for sorting and removal of holdout mail from the mail sorting stream in the initial sorting pass of a multiple pass sequential mail sort. It also includes such a step which is performed in the final sorting pass. The system further provides a lookup procedure for hashing the sort plan binary file to allow for rapid lookup of the zip code and associated sort sequence codes included in the sort plan, whereby a sorting machine uses the sort sequence code to sort mail into an appropriate bin. The system is informed of the pass in which holdouts are to be offloaded and of the holdout special handling categories to be used in the offloading pass, and of the number of sequential sorting passes to be used.

7 Claims, 4 Drawing Sheets

MAIL BIN SORT SEQUENCE BINARY FILE GENERATOR

CROSS REFERENCE TO RELATED APPLICATIONS

This application claims the benefit of the filing date of U.S. Provisional Application Serial No. 60/227,335 filed Aug. 23, 2000, and the subject matter of which is incorporated herein by reference.

FIELD OF THE INVENTION

This invention relates generally to sequential mail sorting, and, more particularly to the sorting of mail into a carrier walk sequence. The invention provides a software solution to the mail sorting problem.

BACKGROUND OF THE INVENTION

Mail needs to be sorted in carrier walk sequence. In practice, all mail is not sorted for delivery. There are "holdouts," i.e., mail pieces that are not deliverable for various reasons. The reasons for such mail not being delivered may include change of address, temporary non-delivery, non-delivery day holds for routes that are not delivered every day, window call pickups, or holdouts for multiple delivery points (e.g. delivery to a company that will sort its own mail internally). It is necessary to provide an efficient off-loading of holdouts in the initial sorting pass.

Currently, holdouts must be manually removed from mail after a final sorting pass. The current Sort Sequence Generator software does not allow for the offloading of holdout mail types after an initial sorting pass. Holdout mail types are sorted sequentially with normal mail types. They are removed with the normal mail types after the final sorting pass has been completed.

Current Sort Sequence Generator/Sorting machines use the concept of inserting a separator card at the beginning of a holdout mail type during the sorting process. This enables removal of the holdout mail types after completion of the final pass from the sorting machine pockets.

The bundles of holdout mail must be hand-transferred to delivery trays at completion of the final pass of sorting. Or, at the end of the initial pass or intermediate passes, holdout mail types must be hand transferred to the sorting machine's induction station for scanning and re-sorting.

Removal of holdout mail types after the initial sort pass increases the efficiency of the sort process by reducing the repeated handling and rescanning of holdout mail types.

BRIEF SUMMARY OF THE INVENTION

It is therefore an object of this invention to generate sort sequence codes and interpret them for the sequential sorting of mail into a mail carrier walk sequence.

It is a further object of this invention to generate and interpret sort sequence code for "holdout mail types" to allow for the sorting and removal of "holdout mail" from the mail sorting stream in the initial sorting pass of a multiple pass sequential mail sort or the final sorting pass.

The objects set forth above as well as further and other objects and advantages of the present invention are achieved by the embodiments of the invention-described below.

The solution was to develop a way to process a U.S. Postal Service (USPS) sort plan and build a sort sequence plan which allows for the offloading of holdouts on an initial sorting pass. The operator or user could decide alternatively to sort holdouts on an initial or on a final pass.

A sort plan text file for the postal delivery zone, is read in, usually to a hard drive of a personal computer. The carriers whose routes are located in the postal zone are selected for sorting. The sort plan text file is read to determine the size (e.g. number of bins in the sorting machine) of the sorting machine needed to sort to the sort plan. Sort sequence codes are generated for the sorting of mail in a sequential order. Depending on options selected by the operator, sequence codes for holdouts are generated accordingly and placed into a sort plan binary file.

Options may include the identity of the pass in which holdouts will be offloaded, the holdout special handling categories to be used in the offloading pass, and the number of sequential sorting passes to use. Then, a sort lookup procedure hashes the sort plan binary file to allow for rapid lookup of the ZIP code and associated sort sequence codes included in the sort plan. The hardware then uses these sort sequence codes to sort the mail into the appropriate bin.

Other objects, features and advantages will be apparent from the following detailed description of preferred embodiments taken in conjunction with the accompanying drawings in which:

DETAILED DESCRIPTION OF THE DRAWING

General Description

Figure 1:
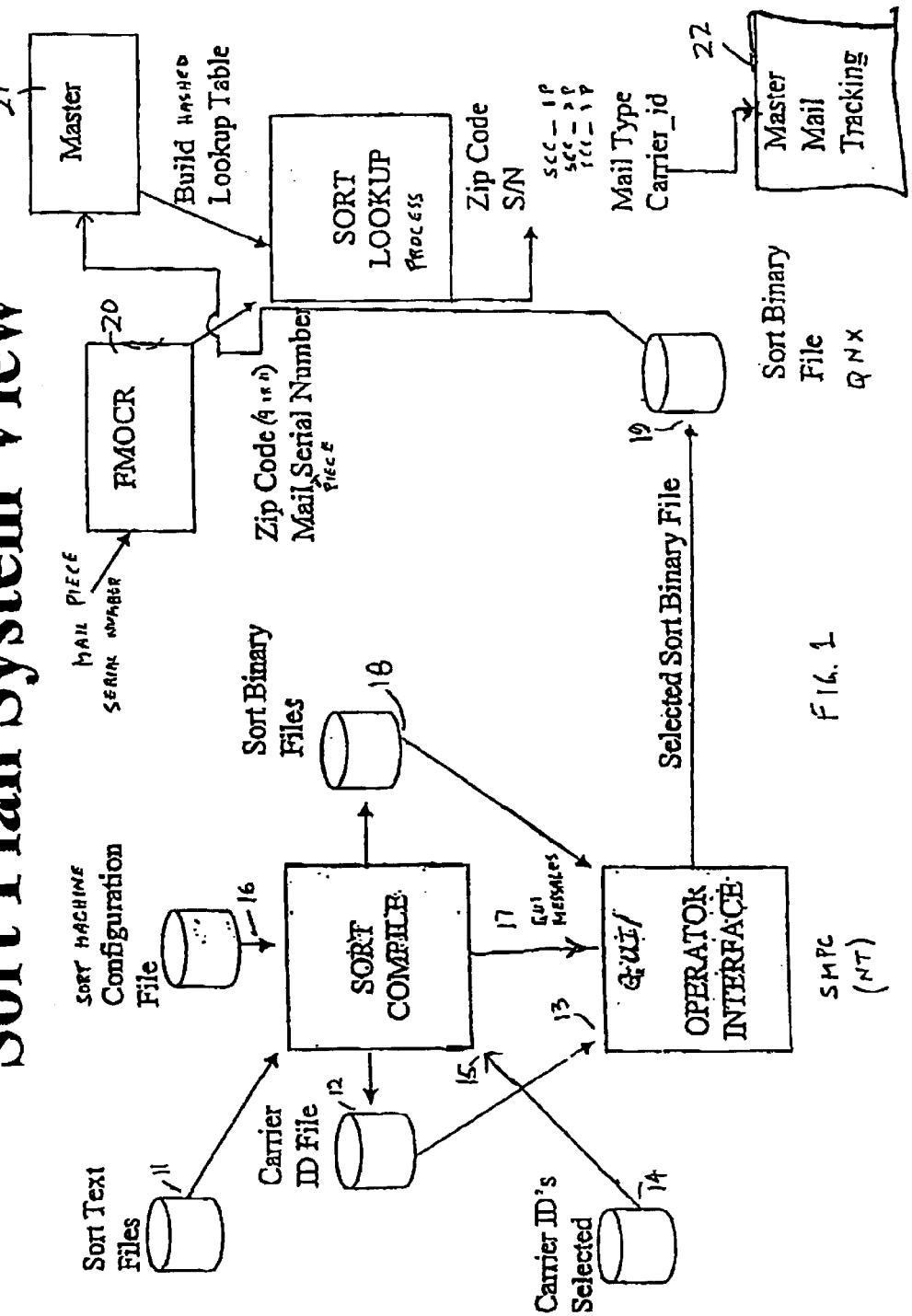
FIG. 1 is Sort Plan System View which represents the relationships between the component parts and the processes of the Sort Plan System.
Figure 2:
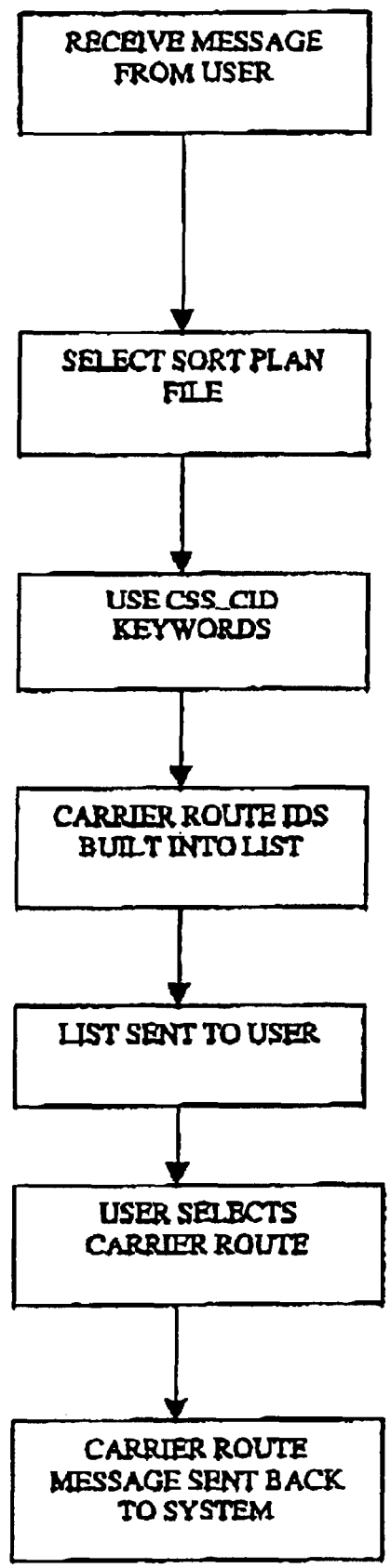
FIG. 2 is a flow diagram of the sort identification.
Figure 3:
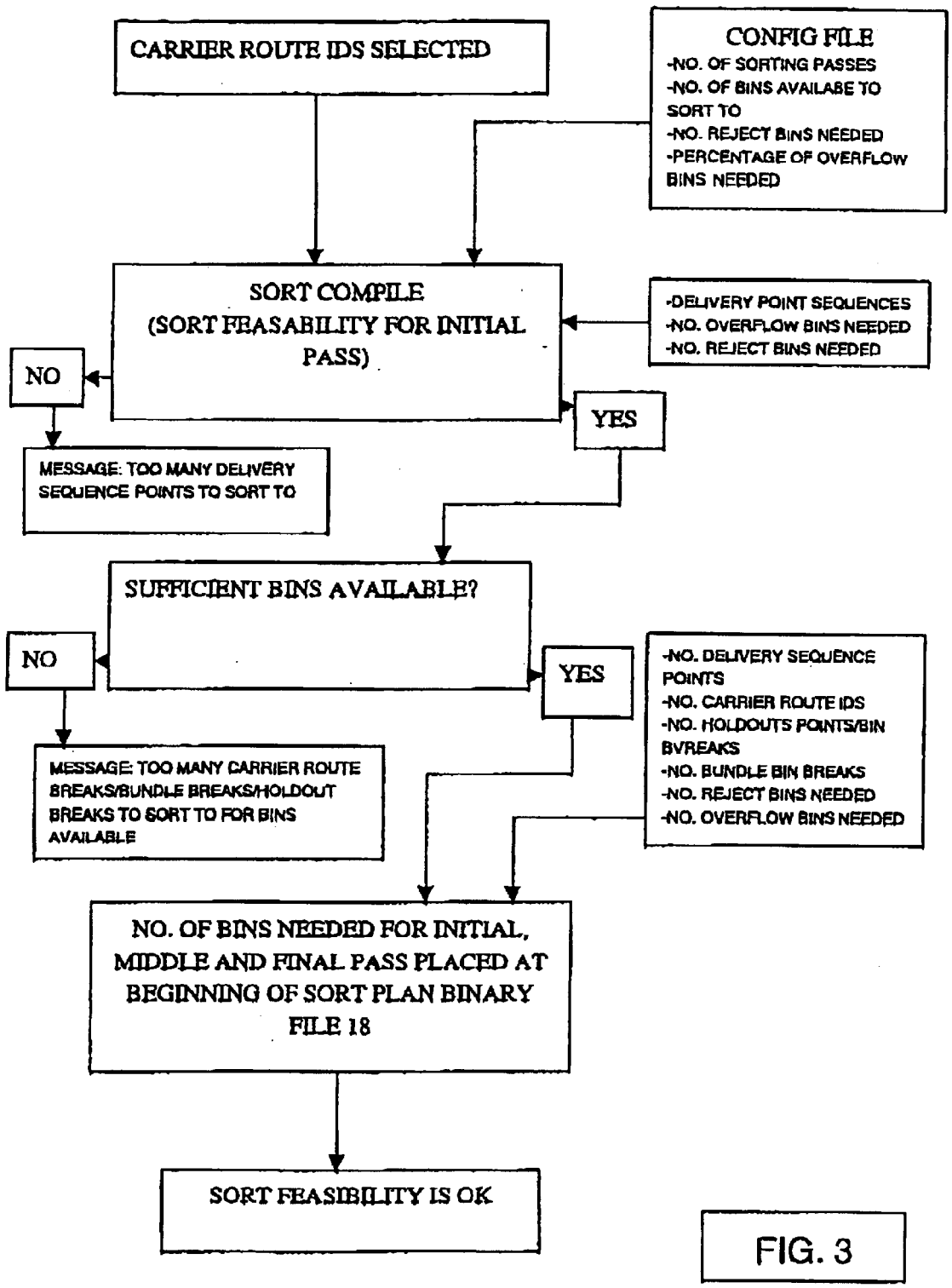
FIG. 3 is a flow diagram of the sort feasibility.
Figure 4:
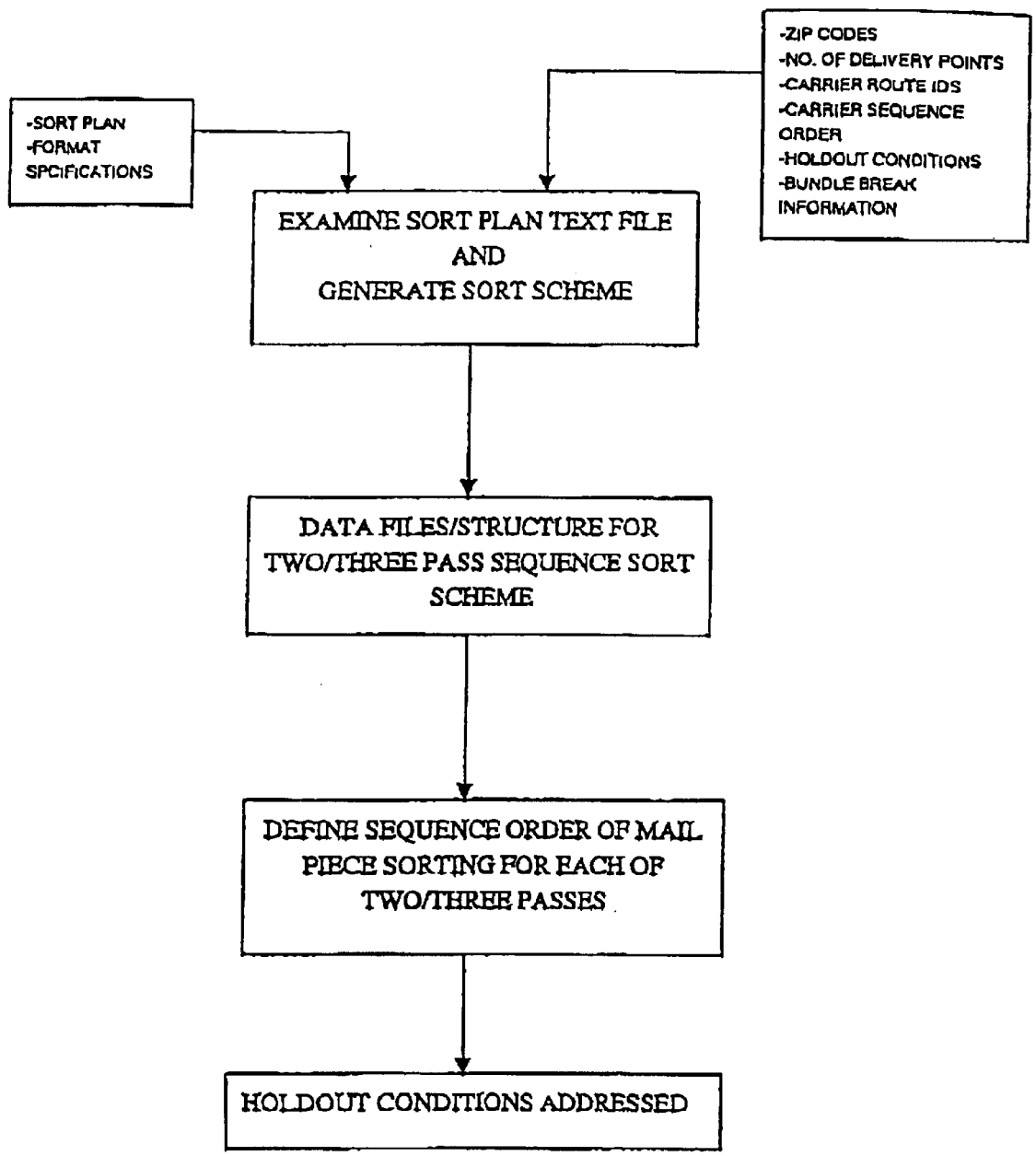
FIG. 4 is a flow diagram of the sort sequencing.

There is an appendix at the end of the provisional application which has been incorporated herein by reference and which provides information on the Sortplan Text Format for USPS Bar Code Sorters which is discussed in this application.

See Table I, below, for the Sort Plan Compile [NT] and Input Structure/File Content Definition.
Process Definition
The Sort Plan Compile Process is divided into three parts:
 (1) Sort Identification;
 (2) Sort Feasibility; and
 (3) Sort Sequencing.
See the drawing figures in connection with this explanation of the present invention. Part 1 is the Sort Identification which begins upon receiving the message "Sort Plan File Name Selected" from the GUI/Operator or system user. This defines the Sort Plan Text File Name 11 selected by the operator. The process will then select the Sort Plan File identified from the sort plan directory on the Station Manager Personal Computer (SMPC). From the file selected, all Carrier Route ID(s) 12 found in the sort plan by using the CSS_CID keywords, as defined in the Sort Plan Text Format for USPS Bar Code Sorters Specification and identified in the Sort plan text file, will be built into a list. The process will then message this list over to the GUI/Operator 13 or user. The operator or user will then select the Carrier Route ID(s) 14 he or she wishes sort on. The GUI/Operator will message the operator's Carrier ID(s) 14 selection back to Sort Plan Compile.

Part 2 is the Sort Feasibility which begins upon receiving the Carrier Route ID(s) 14 selected by the GUI/Operator or user 15. The process will determine if there are sufficient bins available to sort to on all passes. A Sort Compile operation will use the "Number of Sorting Passes" message from the GUI and the "Number of Bins Available To Sort To", "Number of Reject Bins Needed", and the "Percentage Of Overflow Bins Needed" values, from the configuration file 16, to determine the feasibility of the sort. Sort feasibility for initial pass will be determined by using the number of delivery point sequences, number of overflow bins needed and number of reject bins needed. If not enough bins are available, the process will issue the "Too Many Delivery Sequence Points to Sort to for Bins Available" message to the GUI/Operator 17. If an initial pass can be accomplished, the process will then examine the number of delivery sequence points, number of Carrier Route ID(s), number of holdouts points/bin breaks, the number of bundle breaks, the number of reject bins needed, and the number of overflow bins needed. If there are insufficient bins available to do this on the second pass, the process will send the "Too Many Carrier Route Breaks/Bundle Breaks/Holdout Breaks to Sort to for Bins Available" message to the GUI/Operator 17. The number of bins needed for the initial, middle and final pass will be placed at the beginning of the Sort Plan Binary File 18.

If the Sort Feasibility of Part 2 is all right, then the process will begin to examine the Sort Plan text file for zip codes, number of delivery points, carrier route ID(s), carrier sequence order, holdout conditions, and bundle break information to begin Part 3 the Sort Sequencing. The process will generate a data files/structure for a two/three-pass sequence sort scheme using the Sort Plan Text Format specification. The internal data structure, Sort Sequence, will have information used by the Sort Lookup process to define sequence order of mail piece sorting for each of the two/three passes as mail is inducted into the sorting machine.

Zip code holdout types in the Sort Plan Text File that will be addressed are:

| | |
|---|---|
| N | Normal DPS record |
| NG | Normal DPS records, grouped for manual on-the-road casing |
| R | Residue/out of sort |
| U | Bundle split/un-assigned ZIP |
| H | Holdout (unspecified) |
| HT | TND Holdout (Temporary Non Deliverable, Vacation holds) |
| HD | NDD Holdout (Non Delivery Day holds) |
| HU | UND Holdout (Undeliverable, Change of Address) |
| HW | WC Holdout (Window Call, Firm Pickup), and |
| HM | MDP Holdout (Multiple Delivery Points). |

Type R—Residue/Out of Sort will be given a Sequence Code of '0x00' as it has been identified as out of sort plan.

Holdout conditions will be addressed in two ways. One way is using Holdout Keyword Switches in the code and the other is using the Keyword function as defined in the Sort Plan STF (sortplan text format) specification. Several Holdout Keyword Switches will be used to define whether the holdout keyword(s) will be used or not used. Holdout Keyword switches for holdout types HT, HU, HD, HM, & HW will be defined. Holdout Keywords used for these holdout types are CSS_TND, CSS_UND, CSS_NDD, CSS_MDP, and CSS_WC, respectively. There are no holdout keywords for holdout types H & HC, but they will have Holdout Keyword switches. If the Holdout Keyword switch is false and the Sort to One Holdout Bin switch is false, the keyword special handling method will not be used. Each of the holdout types chosen will be sorted to its own separate bin(s), each holdout type will be treated as one DPS (Delivery Point Sequence) per bin, so that it can be off loaded after the first pass. The holdout mail pieces will not be sorted sequentially by Zip code in the bin. If the Sort to One Holdout Bin switch is true, then all holdout types whose Holdout Keyword switch is false will be sorted to one bin and off loaded at the end of the first pass. Mail pieces in the bin will not be sorted sequentially by holdout type or Zip code. The number of bins to be off loaded on the first pass will be placed in the Sort Plan Compile file along with their respective sequence sort codes.

If the Holdout Keyword Switch is set true, then the keyword special handling methods will be used. Holdout types that are selected with the special handling categories of Front will be sequentially sorted to the front of the carrier route mail packet. Each holdout type identified with a keyword and switch setting of true will have its own DPS for each Holdout Zip Code in the sort plan. Special handling category Back will have holdout types identified sort sequentially, each with its own DPS for each Holdout Zip Code in the sort plan, to the back of the carrier route's mail packet with a bin break for the start of each holdout type selected. Category Ignore will treat holdout types identified as normal DPS in the sort plan. They will be sorted just as they appear in the sort plan with no bin break at the start or end of the holdout type. Category Residue will treat holdout types identified as Out of Sort Plan. They will be assigned a sequence sort code of '0x00'. The Holdout special handling category will treat holdout types identified as follows. The holdout type(s) identified will have its associated Holdout Zip Codes sort sequentially, each with its own DPS as they appear in the sort plan. On a second pass, the starting DPS holdout type identified will start a bin break. When the mail type changes from the holdout type identified to another mail type, a new bin break will be started. If the Holdout Keyword Switch is set true and the Holdout Keyword is not present, then the holdout type will be treated as a special handling category Holdout. There will be a bin break in front of the holdout type selected and a bin break will be started with the next mail type found sequentially in the STF file.

The process will begin to build the Zip Lookup Tables which will be included in the Sort Plan Binary file 18 and write it to the NT hard drive.

After completing the construction of the Sort Plan Compile File and writing to disk, the process will send the "Sort Compile File Complete" message to the GUI/Operator 17.

See Table II for Output Messages and Output Structure Content Definition.

See Table III for Sort Lookup [QNX] including Input Messages and input Structure Content Definition.

Process Definition

See Table IV for Output Messages and Output Structure Content Definition in connection with this.

Upon receiving the "Load Selected Sort Plan Binary file" message from the NT GUI/Operator 19 to the Master Control 21, the process will load the file messaged over and hash it into an internal data structure. Sort Lookup will be put in a wait state for the first piece of mail to be inducted. The process will wait to receive input from the FMOCR 20. The process will then extract the Destination Zip Code, Zip Code Length, and Mail Piece Serial Number from the information provided by the FMOCR 20. The process will use the hash of the Destination Zip Code to do an expedient lookup search in the Hash Lookup table to determine the correct Zip Lookup table. The Destination Zip Code, along with the Zip Lookup table will be used to determine the Sequence Sort Codes associated with that Zip code. Zip Code lengths of 5 will be considered out of sort plan. Before hashing, a check will be made to determine if the first 5 digits of the Zip Code, for 9 & 11 digits Zip Codes are in the sort plan. If not an Out of Sort Plan Sequence Code ('0x00') will be generated. If there is a hit on the Hash table and Zip Lookup tables, the process will then message the Sequence Code, which will contain the Zip Code, Mail Piece Serial Number, First Pass Sequence Sort Code, Second Pass Sequence Sort Code, and Third Pass Sequence Sort Code to Mail Tracking 22. If the Zip Code cannot be found in the Hash Lookup table, the process will assign a zero sequence code ('0x00') to the Initial Pass, Middle Pass and Finial Sequence Sort Code in the message to Mail Tracking 22 for the Out of Sort Plan condition. No Code, No Read, mail pieces will receive a '0xFF' in the First Pass, Second Pass and Third Pass Sequence Sort Code.

TABLE I

Sort Plan Compile [NT]

Messages

| | |
|---|---|
| "Sort Plan Text File Name Selected" | from GUI/Operator |
| "Carrier ID(s) Selected" from Sort Plan | from GUI/Operator |
| "Number of Sorting Passes" (default is 2, max is 3) | from GUI/Operator |
| "Number of Bins Available To Sort To" | |
| "Number of Reject Bins Needed" | |
| "Percentage of Bins Needed for Overflow" | from configuration file on hard drive |
| SMPC (Station Manager Personal computer) | |

Input Structure/File Content Definition
    Sort Plan Text File(s) (STF)
        {Sort Plan Text Format for USPS Bar Code Sorters, USPS Engineering, Software Design© copyright 1993, Draft Version 3.00 7/8/97} [See Appendix hereto]

TABLE II

Output Messages

| | |
|---|---|
| "Too Many Delivery Point Sequences To Sort To For Bins Available" | to GUI on SMPC |
| "Too Many Carrier Route Breaks/Bundle breaks/Holdout Breaks To Sort To For Bins Available" | to GUI on SMPC |
| "List of Carrier Route ID's in Sort Plan" (using the CSS_CID keyword in sort plan) | to GUI on SMPC |
| "Sort Plan Compile File Completed" | to GUI on SMPC |

Output Structure Content Definition

| | |
|---|---|
| Sort Plan Compile File/Structure | to SMPC Hard Drive |
| Number of Bins Needed First Pass | |
| Number of Bins Needed Second Pass | |
| Number of Bins Needed Third Pass | |
| Number of Holdout Bins Off Loaded First Pass | |
| Sort Sequence Code Number To Be Off Loaded | |
| . | |
| . | |
| . | |
| Next Sort Sequence Code Number To Be Off Loaded | |
| . | |
| . | |
| . | |
| Last Sort Sequence Code Number To Be Off Loaded | |
| Number of Entries in the Hash Lookup Table | |
| Zip Hash Code | |
| Pointer to Zip Lookup Table | |
| Number of Zip Lookup Tables | |
| Zip Lookup Table | |
| For each zip code in the carrier route(s) selected: | |
| Zip code | |
| First Pass Sequence Sort Code (using 8 bits & starting with one & bounded by the number sort bins first pass) | |
| Second Pass Sequence Sort Code (using 8 bits & starting with one & bounded by the number sort bins second pass) | |
| Third Pass Sequence Sort Code (using 8 bits & starting with one & bounded by the number sort bins third pass) | |
| . | |
| . | |
| . | |
| Next Zip Lookup Table | |
| . | |
| . | |
| . | |
| Last Zip Lookup Table | |

TABLE III

Sort Lookup [QNX]

Input Messages

| | |
|---|---|
| Load Selected Sort Plan Compile File | from NT GUI/Operator |
| Destination Zip code, Zip Code Length & Mail Piece Serial Number | from FMOCR |

Input Structure Content Definition

| | |
|---|---|
| Sort Plan Compile File/Structure | for Sort Lookup |
| Number of Bins Needed First Pass | |
| Number of Bins Needed Second Pass | |
| Number of Bins Needed Third Pass | |
| Number of Holdout Bins Off Loaded First Pass | |
| Sort Sequence Code Number To Be Off Loaded | |
| . | |
| . | |
| . | |
| Next Sort Sequence Code Number To Be Off Loaded | |
| . | |
| . | |
| . | |
| Last Sort Sequence Code Number To Be Off Loaded | |
| Number of Entries in the Hash Lookup Table | |
| Zip Hash Code | |
| Pointer to Zip Lookup Table | |
| Number of Zip Lookup Tables | |
| Zip Lookup Table | |
| For each zip code in the carrier route(s) selected: | |
| Zip code | |
| First Pass Sequence Sort Code (using 8 bits & starting with one & bounded by the number sort bins first pass) | |
| Second Pass Sequence Sort Code (using 8 bits & starting with one & bounded by the number sort bins second pass) | |
| Third Pass Sequence Sort Code (using 8 bits & starting with one & bounded by the number sort bins second pass) | |
| . | |
| . | |
| . | |
| Next Zip Lookup Table | |
| . | |
| . | |
| . | |
| Last Zip Lookup Table | |

TABLE IV

Output Messages

| | |
|---|---|
| "Sequence Code" | to Mail Tracking |

Output Structure Content Definition

| | |
|---|---|
| Sequence Code | to Mail Tracking |
| Zip Code | |

TABLE IV-continued

Mail Piece Serial Number
First Pass Sequence Sort Code
Second Pass Sequence Sort Code
Third Pass Sequence Sort Code It will now be apparent to those skilled in the art that other embodiments, improvements, details, and uses can be made consistent with the letter and spirit of the foregoing disclosure and within the scope of this provisional patent application.

What is claimed is:

1. A sequential mail sorting system for generating sort sequence codes, interpreting them for the sequential sorting of mail into a mail carrier walk sequence and providing for holdout mail types, comprising:
   a. reading a sort plan text file for a selected postal delivery zone and determining the number of bins required in the sorting machine;
   b. selecting the carriers whose routes are located in such zone;
   c. generating sort sequence codes for sorting the mail in a sequential order; and
   d. generating sequence codes for holdouts and regular mail types and placing them into a sort plan binary file, and
   wherein the step of generating of sort sequence codes includes generating and interpreting sort sequence codes for holdout mail types to allow for sorting and removal of holdout mail from the mail sorting stream in the final sorting pass of a multiple pass sequential mail sort.

2. A sequential mail sorting system as defined in claim 1 further comprising providing a lookup procedure for hashing the sort plan binary file to allow for rapid lookup of the zip code and associated sort sequence codes included in the sort plan, whereby a sorting machine uses the sort sequence code to sort mail into an appropriate bin.

3. A sequential mail sorting system as defined in claim 1 further comprising providing a lookup procedure for hashing the sort plan binary file to allow for speedy lookup of the zip code and associated sort sequence codes included in the sort plan, whereby a sorting machine uses the sort sequence code to sort mail into an appropriate bin.

4. A sequential mail sorting system for generating sort sequence codes, interpreting them for the sequential sorting of mail into a mail carrier walk sequence and providing for holdout mail types, comprising:
   a. reading a sort plan text file for a selected postal delivery zone and determining the number of bins required in the sorting machine;
   b. selecting the carriers whose routes are located in such zone;
   c. generating sort sequence codes for sorting the mail in a sequential order; and
   d. generating sequence codes for holdouts and regular mail types and placing them into a sort plan binary file, the generating of sort sequence codes including generating and interpreting sort sequence codes for holdout mail types to allow for sorting and removal of holdout mail from the mail sorting stream in the initial sorting pass of a multiple pass sequential mail sort; and
   wherein the generating of sort sequence codes further includes generating and interpreting sort sequence codes for holdout mail types to allow for sorting and removal of holdout mail from the mail sorting stream in the final sorting pass of a multiple pass sequential mail sort.

5. A sorting system as defined in claim 4 further comprising providing a lookup procedure for hashing the sort plan binary file to allow for speedy lookup of the zip code and associated sort sequence codes included in the sort plan, whereby a sorting machine uses the sort sequence code to sort mail into an appropriate bin.

6. A sorting system for generating sort sequence codes, interpreting them for the sequential sorting of mail into a mail carrier walk sequence and providing for holdout mail types, comprising:
   a. reading a sort plan text file for a selected postal delivery zone and determining the number of bins required in the sorting machine;
   b. selecting the carriers whose routes are located in such zone;
   c. generating sort sequence codes for sorting the mail in a sequential order; and
   d. generating sequence codes for holdouts and regular mail types and placing them into a sort plan binary file; and
   wherein the system is informed of the pass in which holdouts are to be offloaded and of the holdout special handling categories to be used in the offloading pass, and of the number of sequential sorting passes to be used.

7. A sorting system as defined in claim 6 further comprising providing a lookup procedure for hashing the sort plan binary file to allow for speedy lookup of the zip code and associated sort sequence codes included in the sort plan, whereby a sorting machine uses the sort sequence code to sort mail into an appropriate bin.

\* \* \* \* \*